United States Patent
Liu et al.

(10) Patent No.: US 10,679,400 B2
(45) Date of Patent: *Jun. 9, 2020

(54) TERMINATION OF ANIMATION

(71) Applicant: Google LLC, Mountain View, CA (US)

(72) Inventors: Tian Liu, Mountain View, CA (US); George Mount, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/527,291

(22) Filed: Jul. 31, 2019

(65) Prior Publication Data

US 2019/0355162 A1 Nov. 21, 2019

Related U.S. Application Data

(63) Continuation of application No. 15/976,965, filed on May 11, 2018, now Pat. No. 10,373,364.

(Continued)

(51) Int. Cl.
*G06T 13/00* (2011.01)
*G06T 13/80* (2011.01)
(Continued)

(52) U.S. Cl.
CPC ............ *G06T 13/80* (2013.01); *G06F 3/0481* (2013.01); *G06F 9/451* (2018.02); *G06T 13/00* (2013.01);
(Continued)

(58) Field of Classification Search
None
See application file for complete search history.

(56) References Cited

U.S. PATENT DOCUMENTS

| 5,937,094 A | 8/1999 | Nagasawa |
| 6,057,847 A * | 5/2000 | Jenkins .................... G06T 15/20 345/422 |

(Continued)

OTHER PUBLICATIONS

'bugzilla.mozilla.org' [online] "Bug 1229462 Use Android Scroller class for fling animation," Last update: 2016 [retrieved on May 9, 2018] Retrieved from Internet: URL<https://bugzilla.mozilla.org/show_bug.cgi?id=1229462> 10 pages.

(Continued)

*Primary Examiner* — Said Broome
(74) *Attorney, Agent, or Firm* — Fish & Richardson P.C.

(57) ABSTRACT

Methods, systems, and apparatus, including computer programs encoded on a computer storage medium, for obtaining a minimum visible change value for a particular animation comprising multiple frames, the minimum visible change value corresponding to a condition at which change to the particular animation is not visible; determining, based on the minimum visible change value, a termination threshold distance from an animation endpoint and a termination threshold velocity for the particular animation; for each frame of the particular animation, determining whether a current distance from the animation endpoint satisfies the termination threshold distance from the animation endpoint and a current velocity satisfies the termination threshold velocity; and in response to determining that the current distance from the animation endpoint satisfies the termination threshold distance from the animation endpoint and the current velocity satisfies the termination threshold velocity, initiating termination of the animation.

20 Claims, 5 Drawing Sheets

Related U.S. Application Data

(60) Provisional application No. 62/507,719, filed on May 17, 2017.

(51) Int. Cl.
  G06F 3/0481 (2013.01)
  G06F 9/451 (2018.01)
  *G06F 3/0488* (2013.01)
  *G06T 7/70* (2017.01)
  *G06T 7/20* (2017.01)

(52) U.S. Cl.
  CPC ............ *G06F 3/04883* (2013.01); *G06T 7/20* (2013.01); *G06T 7/70* (2017.01); *G06T 2200/24* (2013.01)

(56) References Cited

U.S. PATENT DOCUMENTS

| | | | | |
|---|---|---|---|---|
| 6,144,385 | A * | 11/2000 | Girard | G06T 13/40 345/424 |
| 6,337,916 | B1 * | 1/2002 | Boyd | H04N 5/262 348/E5.051 |
| 8,269,778 | B1 * | 9/2012 | Baraff | G06T 13/20 345/156 |
| 2013/0033499 | A1 | 2/2013 | Monteux et al. | |
| 2013/0083037 | A1 | 4/2013 | Rodgers | |
| 2014/0344729 | A1 | 11/2014 | Blanco et al. | |
| 2015/0334075 | A1 | 11/2015 | Wang et al. | |
| 2016/0357400 | A1 * | 12/2016 | Penha | H04N 5/23216 |
| 2018/0336717 | A1 | 11/2018 | Liu et al. | |

OTHER PUBLICATIONS

'developer.android.com' [online] "Scroller," [Retrieved on May 9, 2018] Retrieved from Internet: URL<ttps://developer.android.com/reference/android/widget/Scroller> 26 pages.

'g3doc.corp.google.com' [online] "Dynamic Animation," [Retrieved on May 16, 2017] Retrieved from Internet: URL<g3doc.corp.google.com/experimental/users/tianliu/physics_based_animation/g3doc/reference/android/support/animation/DynamicAnimation.html> 10 pages.

'stackoverflow.com' [online] "How to scroller scroll smoothly?," Jan. 13, 2012, [retrieved on May 9, 2018] Retrieved from Internet: URL< https://stackoverflow.com/questions/8849136/how-to-scroller-scroll-smoothly> 3 pages.

Myszkowski. "Perception-based global illumination, rendering, and animation techniques," Computer Graphics, ACM, Apr. 24, 2002, 12 pages.

PCT International Application No. PCT/US2018/033212, dated Aug. 9, 2018, 17 pages.

PCT International Preliminary Report on Patentability in International Application No. PCT/US2018/033212, dated Nov. 19, 2019, 17 pages.

Response to Communication pursuant to Rules 161(1) and 162 EPC dated Aug. 2, 2019, from counterpart European Application No. 18733716.7, filed Feb. 12, 2010, 22 pp.

* cited by examiner

TERMINATION OF ANIMATION

CROSS-REFERENCE TO RELATED APPLICATION

This application is a continuation of U.S. application Ser. No. 15/976,965, filed May 11, 2017, which claims the benefit of U.S. Provisional Application No. 62/507,719, filed on May 17, 2017, the contents of each are which incorporated by reference herein.

FIELD

The present specification generally relates to efficient termination conditions for animation.

BACKGROUND

User interfaces may use animation to provide a variety of information on a display screen. For example, user interfaces may use animation to indicate an occurrence of an event, transition between information, user interaction, or the like. Some devices include touchscreens for receiving input, and accept input by detecting movements of an input object in contact with the touchscreen. In certain circumstances, animation processing may continue even when there is no visible animation change on the screen, which results in wasted resources.

SUMMARY

It has been observed by the inventors that terminating animation processing once there is no longer a visible change in the animation would improve efficiency by reducing the resources consumed by the animation processing; but to achieve this effectively requires a solution to be provided in a manner which enables determination of efficient termination conditions for the animation. To this end, an innovative aspect of the subject matter described in this specification is enabling efficient termination conditions for an animation to be determined and applied, thereby terminating the animation when there is no longer a visible or perceptible change in the animation. According to implementations of the disclosure, the animation will neither end too early (e.g., resulting in an undesirable visual jump to the ending position), nor end too late (e.g., wasting CPU cycles and therefore battery) while making no visible change on screen. The described solutions provide advantages of decreasing the computational and power resources required for the animation, as well as more effectively terminating the animation leading to a decreased animation processing time.

One innovative aspect of the subject matter described in this specification is embodied in methods that may include the actions of obtaining, for a particular animation comprising multiple frames, a minimum visible change value that indicates a condition at which change to the particular animation is not visible; determining, based on the minimum visible change value, a termination threshold distance that indicates a distance from an animation endpoint at which to terminate the particular animation; and determining, based on the minimum visible change value, a termination threshold velocity that indicates a velocity at which to terminate the particular animation. The methods may further include the actions of, for each frame of the particular animation, determining whether a current distance from the animation endpoint satisfies the termination threshold distance from the animation endpoint and whether a current velocity satisfies the termination threshold velocity; and in response to determining that the current distance from the animation endpoint satisfies the termination threshold distance and that the current velocity satisfies the termination threshold velocity, initiating termination of the animation.

According to another aspect of the subject matter described in this specification, the methods include the actions of obtaining data associated with a display screen density of a user device on which the particular animation is displayed, and modifying, based on the data associated with the display screen density of the user device, at least one of the termination threshold distance and the termination threshold velocity for the particular animation.

These and other embodiments may each optionally include one or more of the following features. For instance, in certain implementations, termination of the animation includes setting animation property values to animation endpoint values for the particular animation. Further, in certain implementations, setting animation property values to animation endpoint values for the particular animation includes setting a position value to the animation endpoint for the particular animation.

In addition, in certain implementations, for each frame of the particular animation, a redraw operation is performed, and termination of the animation includes preventing an additional redraw operation to be performed for the particular animation.

Further, for instance, in certain implementations, the minimum visible change value for the particular animation is obtained based on animation property values associated with the particular animation.

Moreover, in certain implementations, the minimum visible change value is obtained from an application developer.

Other embodiments of these aspects include corresponding systems, apparatus, and computer programs, configured to perform the actions of the methods, encoded on computer storage devices. For instance, a system comprising one or more computers and one or more storage devices storing instructions that are operable, when executed by the one or more computers, to cause the one or more computers to perform operations.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
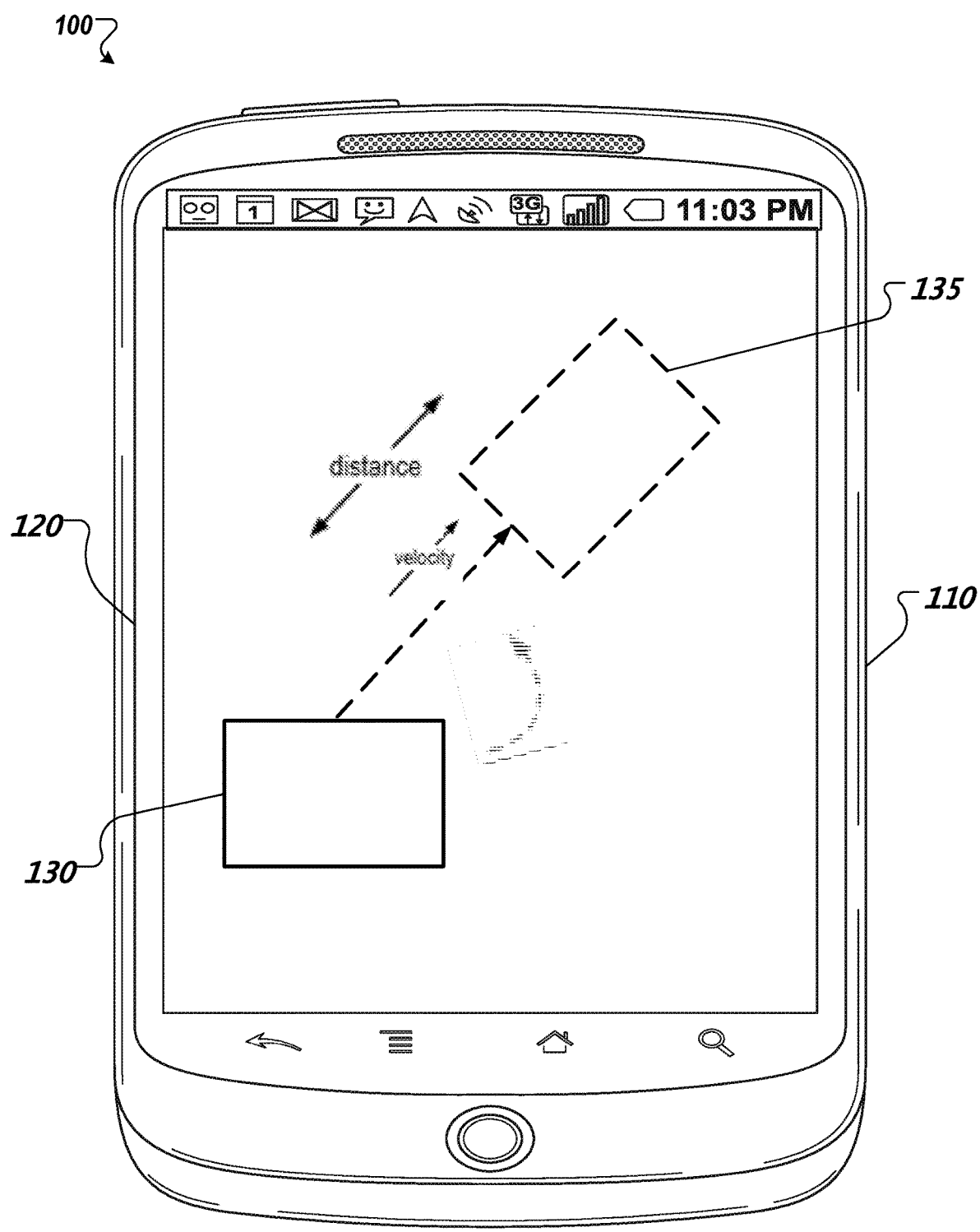
FIG. 1 is a diagram of an example device, according to embodiments of the disclosure.

FIG. 1 is a diagram of an example device 100, according to embodiments of the disclosure. Device 100 is a portable device, which may be, for example, a smart phone or a tablet computer. In certain implementations, the device 100 may be a cellular phone, tablet, laptop computer, desktop computer, e-reader, assistant device, wearable device, or other computing device. The device 100 may communicate with various content providers, servers, etc. via a communication link, which may be wired, e.g., Universal Serial Bus (USB), Ethernet, High Speed Serial Bus, or the like, or wireless, e.g., Bluetooth, Wi-Fi, cellular network, or other wireless network, or the like.

The device 100 may include a display 120 in a device housing 110. The display 120 may include a touchscreen interface, such as a resistive touchscreen, capacitive touchscreen, or the like. In implementations with a touchscreen, the touchscreen may incorporate one or more touch sensors and a touch-sensor controller for detecting the presence and location of a touch, e.g., from a user's finger, or the proximity of an object, e.g., a stylus. In certain implementations, the display 120 may be a display screen without a touch interface.

The display 120 may present information to a user, which may include a user interface element or display object 130. In use, the display object 130 may be animated. For example, as depicted in FIG. 1, the display object may move on the display screen while rotating. At the end of the example animation depicted in FIG. 1, the display object reaches an animation endpoint and is positioned according to display object 135.

The animation of the display object 130 may include multiple frames as the display object 130 is moved from its position at 130 to its position at 135. A redraw operation may be performed to render each frame of the animation. As the animated display object 130 reaches its endpoint location at 135, the animation may appear to slow down, i.e., velocity decreases, and thus, the positional movement of the display object 130 decreases. As the animation slows down, the values of animation properties may continue to change and redraw operations continue to occur, even when there may be no visible or perceptible change of the display object 130 on the display screen 120. Because there is no visible or perceptible change of the display object 130 on the display screen 120, the redraw operations that occur when there is no visible or perceptible change are unnecessary for presenting the information on the display screen 120, and disadvantageously use computational resources and power resources, e.g., battery power.

Thus, according to implementations of the present disclosure, the most efficient termination condition of an animation is determined. In one aspect, an application developer may provide a value for a minimum visible change in terms of the values of one or more animation properties. For example, if the application is animating pixels, one pixel may be used as the minimum visible change on the display screen. Thus, for example, the minimum visible change value may correspond to the smallest value for an animation property that would make a visible or perceptible change on the display screen.

According to certain implementations, default minimum visible change values may be predetermined for animating scale, pixel, rotation, alpha, or the like, or any combination thereof. In addition, according to certain implementations, predetermined formulas or guidelines may be provided to calculate the minimum visible change value for a custom animation property, e.g., a property that is not standard scale, pixel, rotation, or alpha. As another example, the minimum visible change value may be calculated using a predetermined function based on one or more properties associated with the particular animation being processed.

In certain implementations, after obtaining the minimum visible change value, which is the smallest value that would make a visible or perceptible change on the display screen, a fraction of that value may be used as a threshold value for terminating animation. Thus, for example, any movement within that threshold will not make a visible difference on the display screen. Alternatively, the minimum visible change value may be applied to a function to determine, for example, a distance threshold that indicates the maximum distance between an animated object and its animation endpoint for which there is no visible or perceptible change. Referring to FIG. 1, as the display object 130 is animated from its starting position to the animation endpoint at display object 135, the display object 130 approaches the endpoint position 135 and the distance, which is marked with a double-headed arrow, from the current position of the display object to the animation endpoint 135 decreases. As the display object 130 gets closer and closer to the endpoint position 135, eventually the distance between the current position of display object 130 and the endpoint position 135 reaches a distance at which there is no visible difference on the display screen 120. That distance is the distance threshold that indicates the maximum distance from the animation endpoint for which there is no visible or perceptible change, and it may be predetermined.

Similarly, in certain implementations, a velocity threshold may be determined based on the minimum visible change value. The velocity threshold may be determined to indicate the maximum velocity that, if within a frame, the movement is small enough, i.e., under the threshold value, the movement is not visible or perceptible on the display screen. In other words, the mathematical position of the animation may change from one frame to the next, but that position would not be represented by a corresponding change in the display of the animation because the change may not be significant enough to warrant that a pixel of the animation be changed. Referring again to FIG. 1, as the display object 130 is animated from its starting position to the animation endpoint at display object 135, the display object 130 approaches the endpoint position 135 and the velocity, which is marked with a directional arrow, decreases. As the display object 130 gets closer and closer to the endpoint position 135, eventually the velocity reaches a value at which there is no visible difference on the display screen 120. That velocity is the velocity threshold that indicates the maximum velocity of the animation object 130 for which there is no visible or perceptible change, and it may be predetermined.

In addition, different electronic computing devices may have different designs. As a result, the size, shape, or aspect ratio of the display screens of different computing devices may differ. According to certain implementations of the disclosure, the minimum visible change value may differ based on the display screen density. For example, for a higher density screen, the number of pixels that would make a visible difference may be increased, for example, because a human may not be able to perceive a change of one pixel or less than one pixel. As another example, if the application animates a scale property, a smaller value, e.g., on the order of hundredths or thousandths, may be used as the minimum visible change value.

Accordingly, in certain implementations, there may be one or more different termination conditions that: (i) adapt various properties that developers may animate, (ii) account for different screen densities, and (iii) terminate the animation in an optimal time that neither wastes computing resources or battery life, nor creates any perceptible visual jump or movement irregularity on the display screen.

Figure 2:
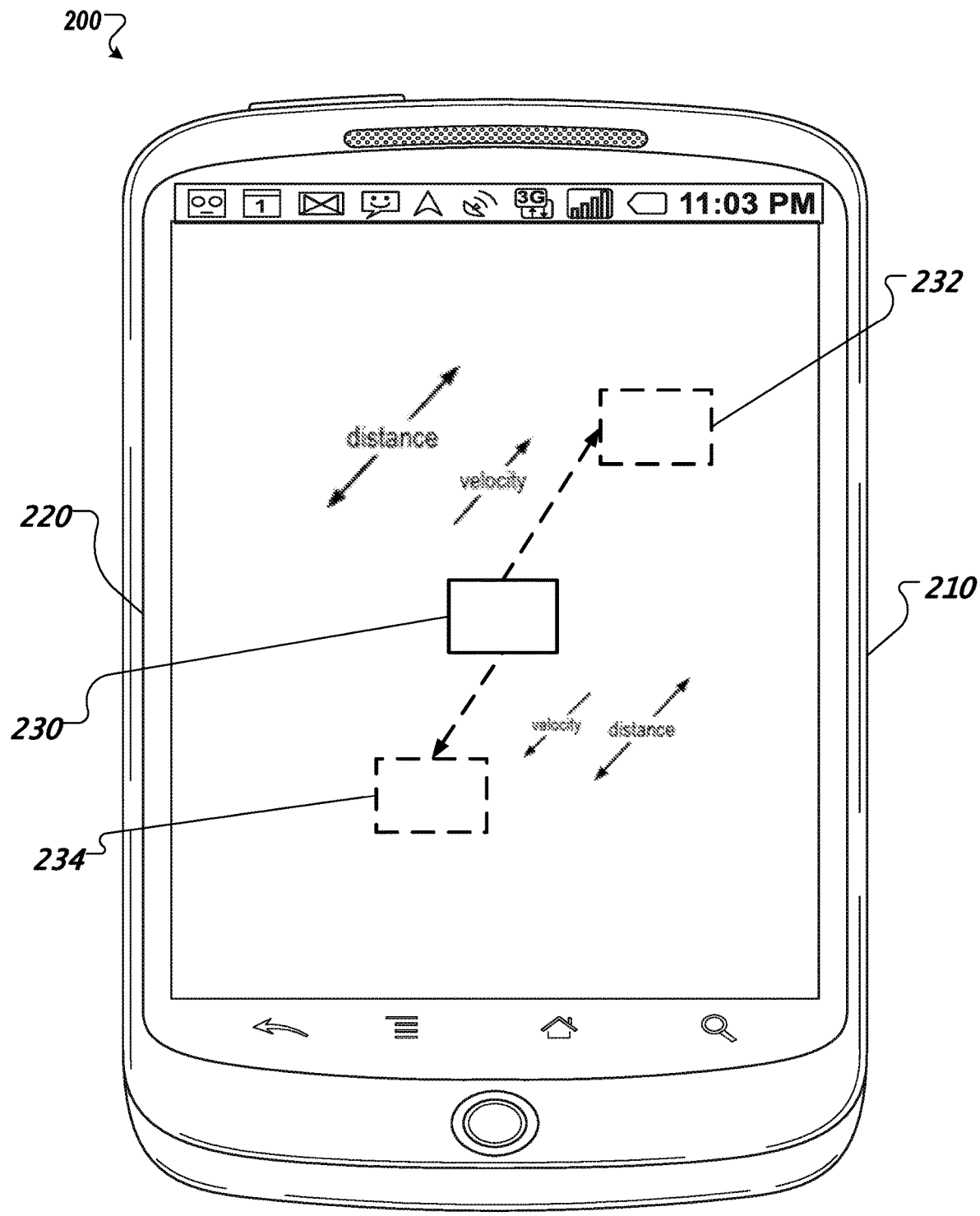
FIG. 2 is a diagram of an example device, according to embodiments of the disclosure.

FIG. 2 is a diagram of an example device 200, according to embodiments of the disclosure. Device 200 is a similar computing device as device 100 and may include a display 220 in a device housing 210. The description of device 100 above equally applies to device 200 depicted in FIG. 2.

In certain implementations, the movements of the display object during an animation sequence may be based on spring motion. For example, the spring motion may be defined based on Hooke's law of elasticity, which, in mechanics and physics, states that the extension of a spring is in direct proportion with the load applied to it. Mathematically, Hooke's law states that $F=-kx$, where x is the displacement of the spring's end from its equilibrium position; F is the restoring force exerted by the spring on that end; and k is the rate of spring constant.

Referring to FIG. 2, in certain implementations, the movements of the display object 230 during an animation sequence may simulate the effect of attaching the display object 230 to one end of an imaginary spring, while the other end of the spring is attached to a position on the screen where the display object 230 is displayed in its original or normal state. During an animation sequence, the display object 230 may be displaced from its original position on the screen, e.g., receding backward, advancing forward, or deforming, or the like, or any combination thereof. For example, in FIG. 2, during the animation, the display object 230 may move to a position at display object 232, and then move to a position at display object 234, in an oscillating and spring-like manner. Nevertheless, the display object 230 may be tethered to its original position and state by the imaginary spring. Thus, the movements of the display object 230 during an animation sequence may have a bouncing visual quality, e.g., bouncing from the original position at 230 to the position at 232 and then to the position at 234.

As depicted in FIG. 2, during such spring animation, the display object 230 may move at a first velocity, depicted by a directional arrow between 230 and 232, between the display object's original position 230 and another position 232 on the display screen 220; and subsequently, the display 230 object may move at a second velocity, depicted by a directional arrow between 230 and 234, toward an additional display object position 234, where a maximum value of the second velocity is less than a maximum value of the first velocity (e.g., because the spring may speed up as it departs 232 for 234, but may not reach as high of a velocity as when it was travelling towards 232 due to simulated frictional values). Further, as depicted in FIG. 2, during such a spring animation, the display object 230 may move a first distance, depicted by a double-ended arrow between 230 and 232, away from its original position on the display screen 220, and subsequently, the display object 230 may approach its original position on the display screen 220, before moving a second distance, depicted by a double-ended arrow between 230 and 234, away from its original position on the display screen 220. In such a scenario, the distance of the display object 230 from the animation endpoint may increase to the first distance, approach zero as the display object 230 approaches its original position on the display screen 220, and then increase again to the second distance.

Accordingly, for efficient and accurate animation termination, the threshold velocity must be used in addition to the threshold distance because if only the threshold distance were used, the animation may terminate prematurely when the display object 230 approaches its original position on the display screen 220, i.e., the distance from the animation endpoint approaches zero, before moving the second distance away from its original position on the display screen 220. However, in certain implementations, such as a fling animation, only the threshold velocity may be used, excluding the threshold distance, in determining the animation termination condition. In other implementations, only the threshold distance may be used, excluding the threshold velocity, in determining the animation termination condition. Thus, in those implementations, at least one of the threshold distance or threshold velocity must be satisfied to initiate termination of the animation.

In particular implementations, the movements of an image or display object in an animation sequence, e.g., the speed at which the image changes its size or moves backward or advances forward, the smallest or largest size of the image used in the animation sequence, etc., may be determined based on the velocity or acceleration of a user's finger when making a touch gesture on a touchscreen of the device that causes the display object to move. For example, if the user makes a swipe gesture by sliding a finger vertically, e.g., up and down, across the touchscreen of an electronic device, the velocity or acceleration of the user's finger moving vertically across the touchscreen may be recorded or determined. Given that the horizontal direction with respect to the screen is the x-direction, the vertical direction with respect to the screen is the y-direction, and the perpendicular direction with respect to the screen is the z-direction, then the velocity or acceleration of the user's finger moving vertically across the touchscreen is the velocity or acceleration in the y-direction. Thus, the user's finger's movements in the y-direction on the touchscreen may control the display object's movements during the animation. For example, if the user makes a faster swipe gesture, the display object may be animated to move faster and/or greater distance. Conversely, if the user makes a slower swipe gesture, the display object may be animated to move slower and/or less distance. In particular embodiments, the velocity of the swiping gesture may be normalized, e.g., for scale and size, by applying a normalization factor.

Figure 3:
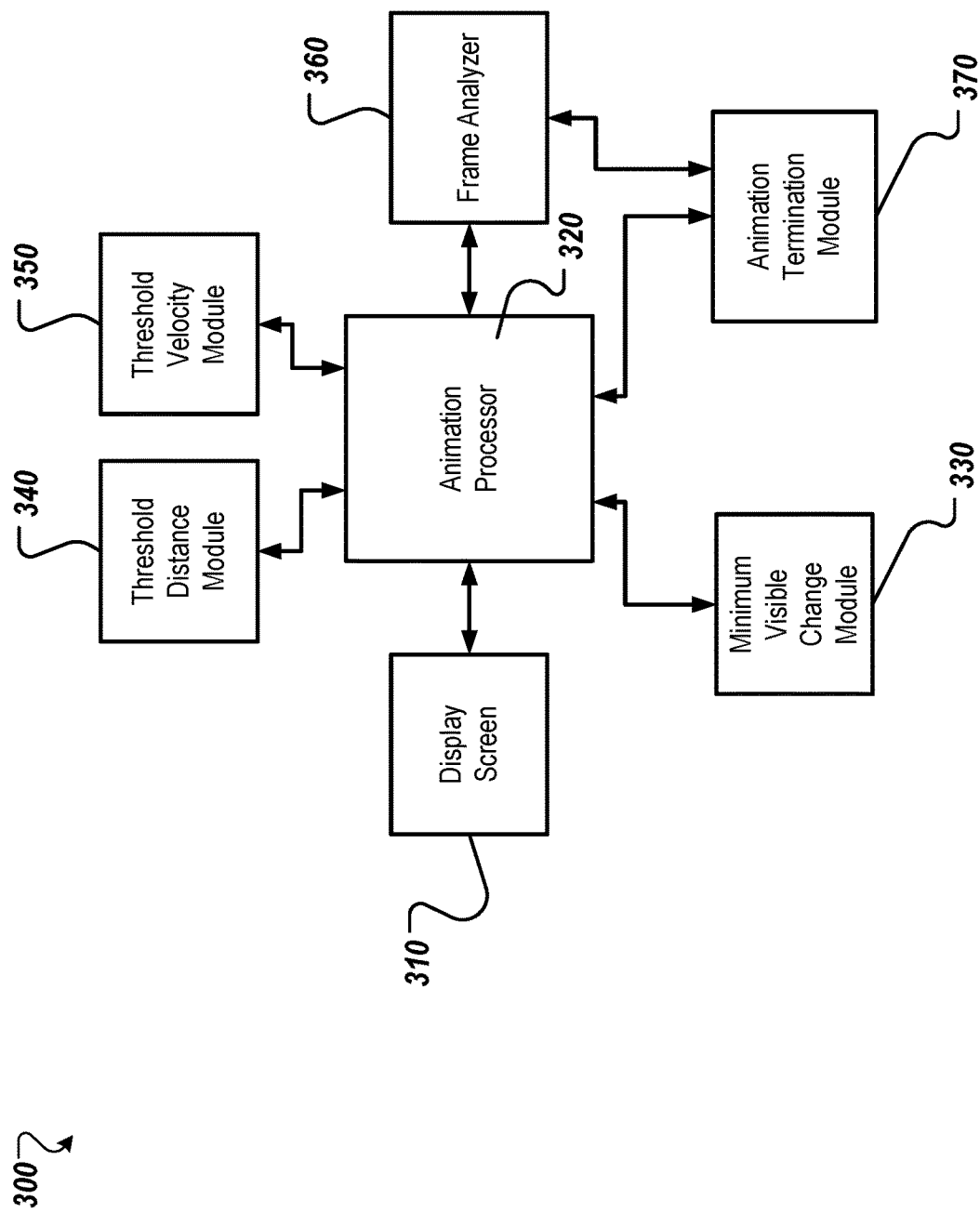
FIG. 3 is a diagram of an example system, according to embodiments of the disclosure.

FIG. 3 is a diagram of an example system 300, according to embodiments of the disclosure. System 300 may include a display screen 310, e.g., associated with a computing device, and an animation processor 320. The animation processor 320 may implement the animation termination process described herein. In addition to the animation processor 320, the system 300 may include a minimum visible change module 330, a threshold distance module 340, a threshold velocity module 350, a frame analyzer 360, and an animation termination module 370.

The minimum visible change module 330 may obtain the minimum visible change value. For example, the minimum visible change module 330 may calculate the minimum visible change value based on animation properties of the particular animation being processed. As another example, the minimum visible change module 330 may select the minimum visible change value from a set of predetermined minimum visible change values based on the animation properties of the particular animation being processed. Alternatively, the minimum visible change module 330 may obtain the minimum visible change value that is provided by the application developer for which the animation is being processed.

The threshold distance module 340 may determine, based on the obtained minimum visible change value, a termination threshold distance that indicates a distance from an animation endpoint at which to terminate the particular animation. For example, the termination threshold distance determined by the threshold distance module 340 may indicate the maximum distance from the animation endpoint for which there is no visible or perceptible change on the display screen 310.

Similarly, the threshold velocity module 350 may determine a termination threshold velocity, which indicates a velocity at which to terminate the particular animation, based on the minimum visible change value. For example, the termination threshold velocity determined by the threshold velocity module 350 may indicate the maximum velocity for the animation at which there is no visible or perceptible change on the display screen 310.

The frame analyzer 360 may analyze each frame of the animation being processed. The frame analyzer 360 may determine whether a current distance from the animation endpoint satisfies the termination threshold distance from the animation endpoint and whether a current velocity satisfies the termination threshold velocity. For example, the frame analyzer 360 may determine the distance of an animated object in the current frame from the endpoint position of the animated object, and compare that distance to the termination threshold distance. Similarly, for example, the frame analyzer 360 may determine the velocity of an animated object in the current frame and compare that velocity to the termination threshold velocity.

If the frame analyzer 360 determines that the current distance from the animation endpoint satisfies the termination threshold distance and that the current velocity satisfies the termination threshold velocity, then animation termination module 370 may initiate termination of the animation. The animation termination module 370 may set animation property values to animation endpoint values for the particular animation. For example, such setting of animation property values to animation endpoint values for the particular animation may include setting a position value to the animation endpoint position value for the particular animation When termination of the animation is initiated, for example, the value for the position of the animated object may be updated to correspond to the animation endpoint position. Other animation property values corresponding to one or more of scale, pixel, rotation, alpha, or the like may similarly be updated to their respective animation ending values in accordance with the particular animation. The animation termination module 370 may prevent an additional redraw operation, which is performed to generate the next frame in the sequence of frames that comprise the animation, from being performed for the particular animation. For example, once the animation termination threshold conditions are satisfied, the animation termination module 370 may prevent the next redraw operation in the animation processing from occurring and the animation is completed.

Figure 4:
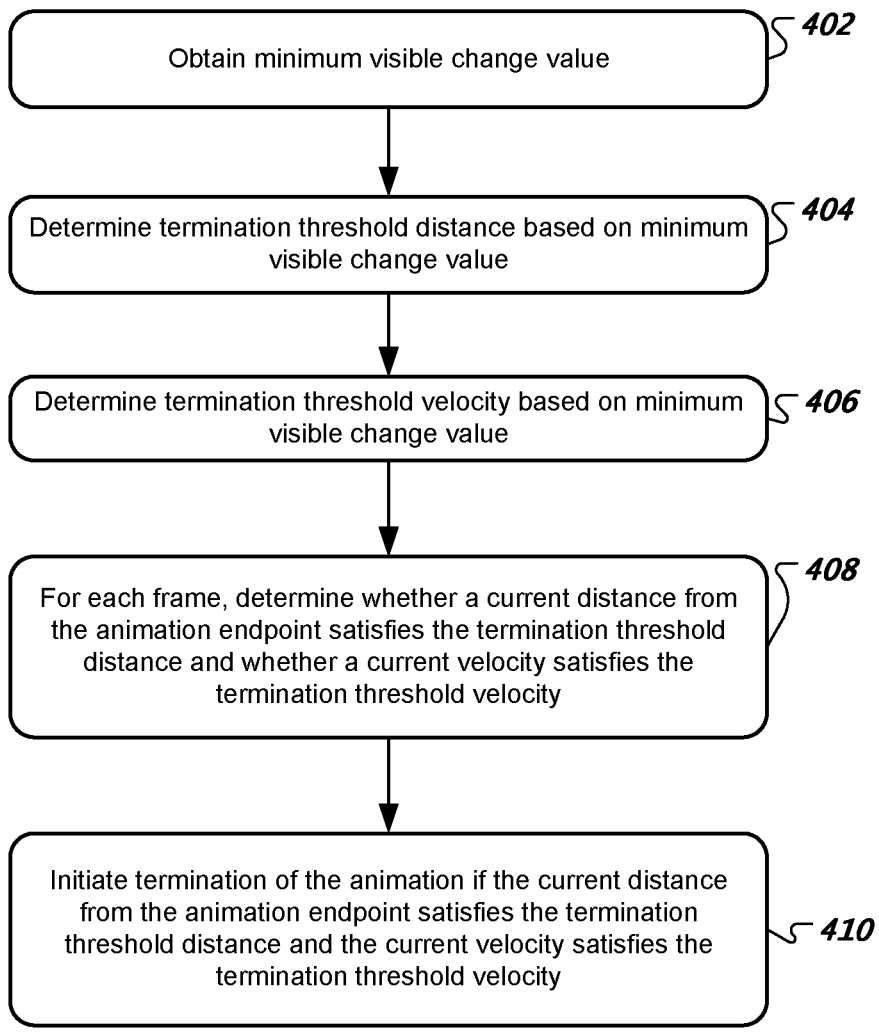
FIG. 4 depicts a flow chart illustrating example processes for terminating an animation, according to embodiments of the disclosure.

FIG. 4 depicts a diagram of an example process for dismissing a user interface element being displayed on a screen. The process 400 may be performed using one or more computing devices such as the computing device 100/200 from FIGS. 1 and 2, the system 300 from FIG. 3, or the like.

The process 400 may include, at 402, obtaining, for a particular animation that has multiple frames, a minimum visible change value that indicates a condition at which change to the particular animation is not visible or perceptible. As described above, this minimum visible change value may be provided by an application developer, may be set to a default value, or may be determined based on properties of the particular animation.

At 404, the process 400 may include determining, based on the obtained minimum visible change value, a termination threshold distance that indicates a distance from an animation endpoint at which to terminate the particular animation. Similarly, at 406, a termination threshold velocity, which indicates a velocity at which to terminate the particular animation, may be determined based on the minimum visible change value.

The process 400 may further include, at 408, for each frame of the particular animation, determining whether a current distance from the animation endpoint satisfies the termination threshold distance from the animation endpoint and whether a current velocity satisfies the termination threshold velocity. In response to determining that the current distance from the animation endpoint satisfies the termination threshold distance from the animation endpoint and that the current velocity satisfies the termination threshold velocity, termination of the animation may be initiated at 410.

In certain implementations, the termination of the animation may include setting animation property values to animation endpoint values for the particular animation. Setting animation property values to animation endpoint values for the particular animation may include setting a position value to the animation endpoint for the particular animation For example, when termination of the animation is initiated, the value for the position of the animated object may be updated to correspond to the animation endpoint position. Other animation property values corresponding to one or more of scale, pixel, rotation, alpha, or the like may similarly be updated to their respective animation ending values in accordance with the particular animation.

In certain embodiments, the process 400 may also include obtaining data associated with a display screen density of a user device on which the particular animation is displayed, and modifying at least one of the termination threshold distance and the termination threshold velocity for the particular animation based on the data associated with the display screen density of the user device.

In certain implementations, for each frame of the particular animation, a redraw operation is performed to generate the next frame in the sequence of frames that comprise the animation. Termination of the animation in the process 400 may also include preventing an additional redraw operation from being performed for the particular animation. For example, once the animation termination threshold conditions are satisfied, the next redraw operation in the animation processing will not occur and the animation is completed.

At 402, in certain implementations, the minimum visible change value for the particular animation is obtained based on animation property values associated with the particular animation. For example, a default minimum visible change value may be selected from predetermined minimum visible change values based on one or more properties associated with the particular animation. As another example, the minimum visible change value may be calculated using a predetermined function based on one or more properties associated with the particular animation. In certain implementations, at 402, the minimum visible change value is obtained from an application developer. For example, if an application developer is using custom animation properties, the application developer may provide the minimum visible change value.

The implementations described in this disclosure may be applicable to any application in which there is a non-fixed duration animation.

Figure 5:
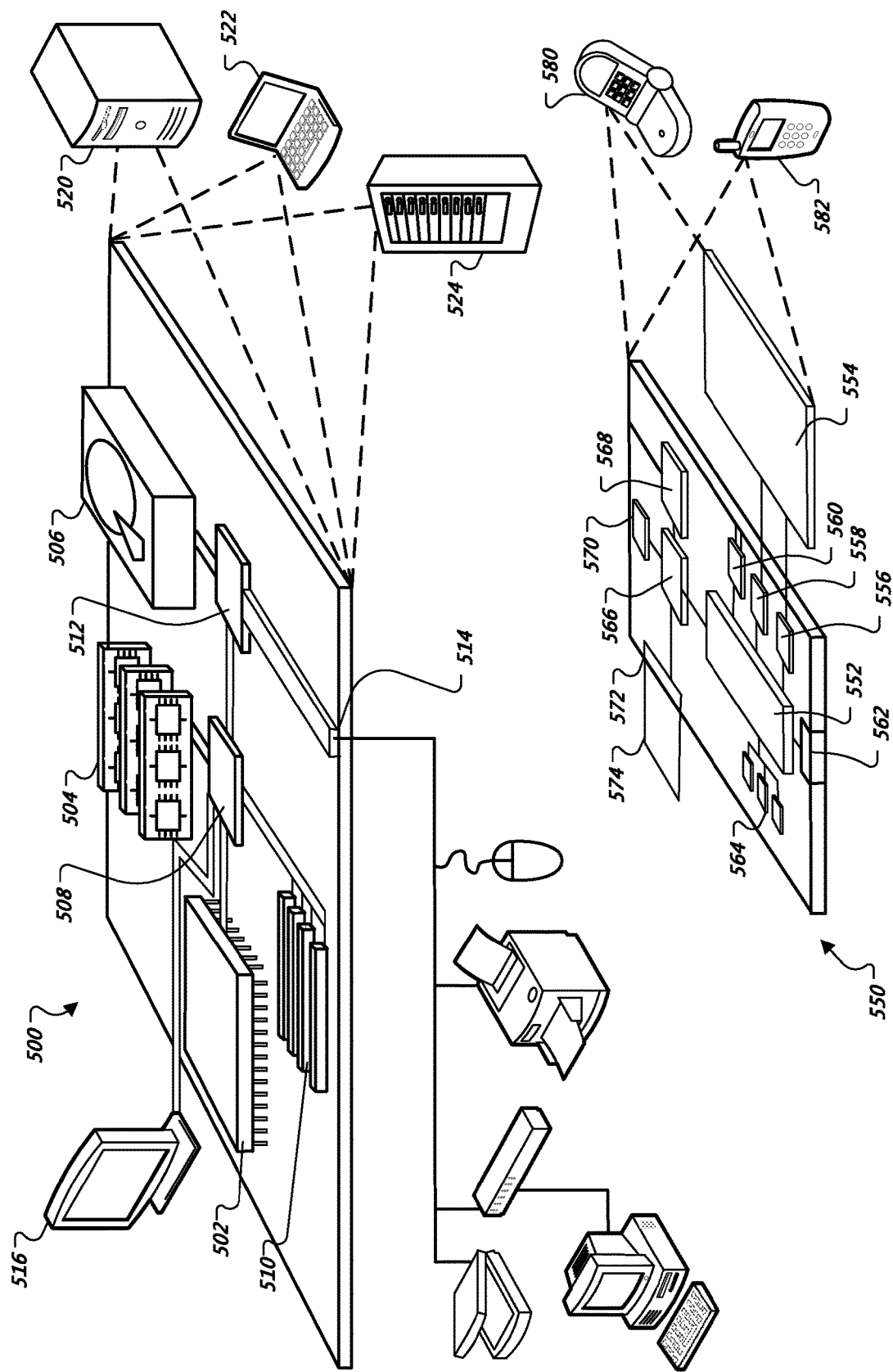
FIG. 5 depicts a computer device and a mobile computer device that may be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or a memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion user interface elements (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 640, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 648 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 554 may also be provided and connected to device 550 through expansion interface 552, which may include, for example, a SIMM (Single In Line Memory Module) user interface element interface. Such expansion memory 554 may provide extra storage space for device 550, or may also store applications or other information for device 550. Specifically, expansion memory 554 may include instructions to carry out or supplement the processes described above, and may include secure information also. Thus, for example, expansion memory 554 may be provide as a security module for device 550, and may be programmed with instructions that permit secure use of device 550. In addition, secure applications may be provided via the SIMM user interface elements, along with additional information, such as placing identifying information on the SIMM user interface element in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 554, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 550 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

A number of implementations have been described. Nevertheless, it will be understood that various modifications may be made without departing from the spirit and scope of the disclosure. For example, various forms of the flows shown above may be used, with steps re-ordered, added, or removed.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., a field programmable gate array (FPGA) or an application specific integrated circuit (ASIC). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network, e.g., the Internet, and peer-to-peer networks, e.g., ad hoc peer-to-peer networks.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any innovations or of what may be claimed, but rather as descriptions of features specific to particular embodiments of particular innovations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where a table or hash table is mentioned, other data structures, such as spreadsheets, relational databases, structured files, or the like, may be used.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
    obtaining, for a particular animation comprising multiple frames, a change value that indicates a condition at which change to the particular animation is not visible;
    determining, based on the change value, a distance from an animation endpoint at which to terminate the particular animation;
    for at least one frame included in the multiple frames of the particular animation:
        determining that a current distance from the animation endpoint satisfies the distance from the animation endpoint at which to terminate the particular animation; and
        initiating termination of the particular animation in response to determining that the current distance from the animation endpoint satisfies the distance from the animation endpoint at which to terminate the particular animation.

2. The computer implemented method of claim 1, comprising:
    obtaining data associated with a display screen density of a user device on which the particular animation is displayed; and
    wherein the distance from the animation endpoint at which to terminate the particular animation is based on the data associated with the display screen density of the user device.

3. The computer implemented method of claim 1, wherein initiating termination of the particular animation comprises setting animation property values to animation endpoint values for the particular animation.

4. The computer implemented method of claim 3, wherein setting animation property values to animation endpoint values for the particular animation comprises setting a position value to the animation endpoint for the particular animation.

5. The computer implemented method of claim 1, further comprising:
performing a redraw operation for at least one frame included in the multiple frames of the particular animation, and
wherein initiating termination of the particular animation comprises preventing an additional redraw operation from being performed for the particular animation.

6. The computer implemented method of claim 1, wherein the change value for the particular animation is obtained based on animation property values associated with the particular animation.

7. The computer implemented method of claim 1, wherein the change value comprises a minimum visible change value.

8. A system comprising:
one or more computers; and
one or more storage devices storing instructions that are operable, when executed by the one or more computers, to cause the one or more computers to perform operations comprising:
obtaining, for a particular animation comprising multiple frames, a change value that indicates a condition at which change to the particular animation is not visible;
determining, based on the change value, a distance from an animation endpoint at which to terminate the particular animation;
for at least one frame included in the multiple frames of the particular animation:
determining that a current distance from the animation endpoint satisfies the distance from the animation endpoint at which to terminate the particular animation; and
initiating termination of the particular animation in response to determining that the current distance from the animation endpoint satisfies the distance from the animation endpoint at which to terminate the particular animation.

9. The system of claim 8, wherein the operations further comprise:
obtaining data associated with a display screen density of a user device on which the particular animation is displayed; and
wherein the distance from the animation endpoint at which to terminate the particular animation is based on the data associated with the display screen density of the user device.

10. The system of claim 8, wherein termination of the particular animation comprises setting animation property values to animation endpoint values for the particular animation.

11. The system of claim 10, wherein setting animation property values to animation endpoint values for the particular animation comprises setting a position value to the animation endpoint for the particular animation.

12. The system of claim 8, wherein the operations further comprise:
performing a redraw operation for at least one frame included in the multiple frames of the particular animation, and
wherein initiating termination of the particular animation comprises preventing an additional redraw operation from being performed for the particular animation.

13. The system of claim 8, wherein the change value for the particular animation is obtained based on animation property values associated with the particular animation.

14. The system of claim 8, wherein the change value comprises a minimum visible change value.

15. A non-transitory computer-readable storage device storing instructions executable by one or more computers which, upon such execution, cause the one or more computers to perform operations comprising:
obtaining, for a particular animation comprising multiple frames, a change value that indicates a condition at which change to the particular animation is not visible;
determining, based on the change value, a distance from an animation endpoint at which to terminate the particular animation;
for at least one frame included in the multiple frames of the particular animation:
determining that a current distance from the animation endpoint satisfies the distance from the animation endpoint at which to terminate the particular animation; and
initiating termination of the particular animation in response to determining that the current distance from the animation endpoint satisfies the distance from the animation endpoint at which to terminate the particular animation.

16. The non-transitory computer-readable storage device of claim 15, wherein the operations further comprise:
obtaining data associated with a display screen density of a user device on which the particular animation is displayed; and
wherein the distance from the animation endpoint at which to terminate the particular animation is based on the data associated with the display screen density of the user device.

17. The non-transitory computer-readable storage device of claim 15, wherein termination of the particular animation comprises setting animation property values to animation endpoint values for the particular animation.

18. The non-transitory computer-readable storage device of claim 17, wherein setting animation property values to animation endpoint values for the particular animation comprises setting a position value to the animation endpoint for the particular animation.

19. The non-transitory computer-readable storage device of claim 15, wherein the operations further comprise:
performing a redraw operation for at least one frame included in the multiple frames of the particular animation, and
wherein initiating termination of the particular animation comprises preventing an additional redraw operation from being performed for the particular animation.

20. The non-transitory computer-readable storage device of claim 15, wherein the change value for the particular animation is obtained based on animation property values associated with the particular animation.

* * * * *